UNITED STATES PATENT OFFICE.

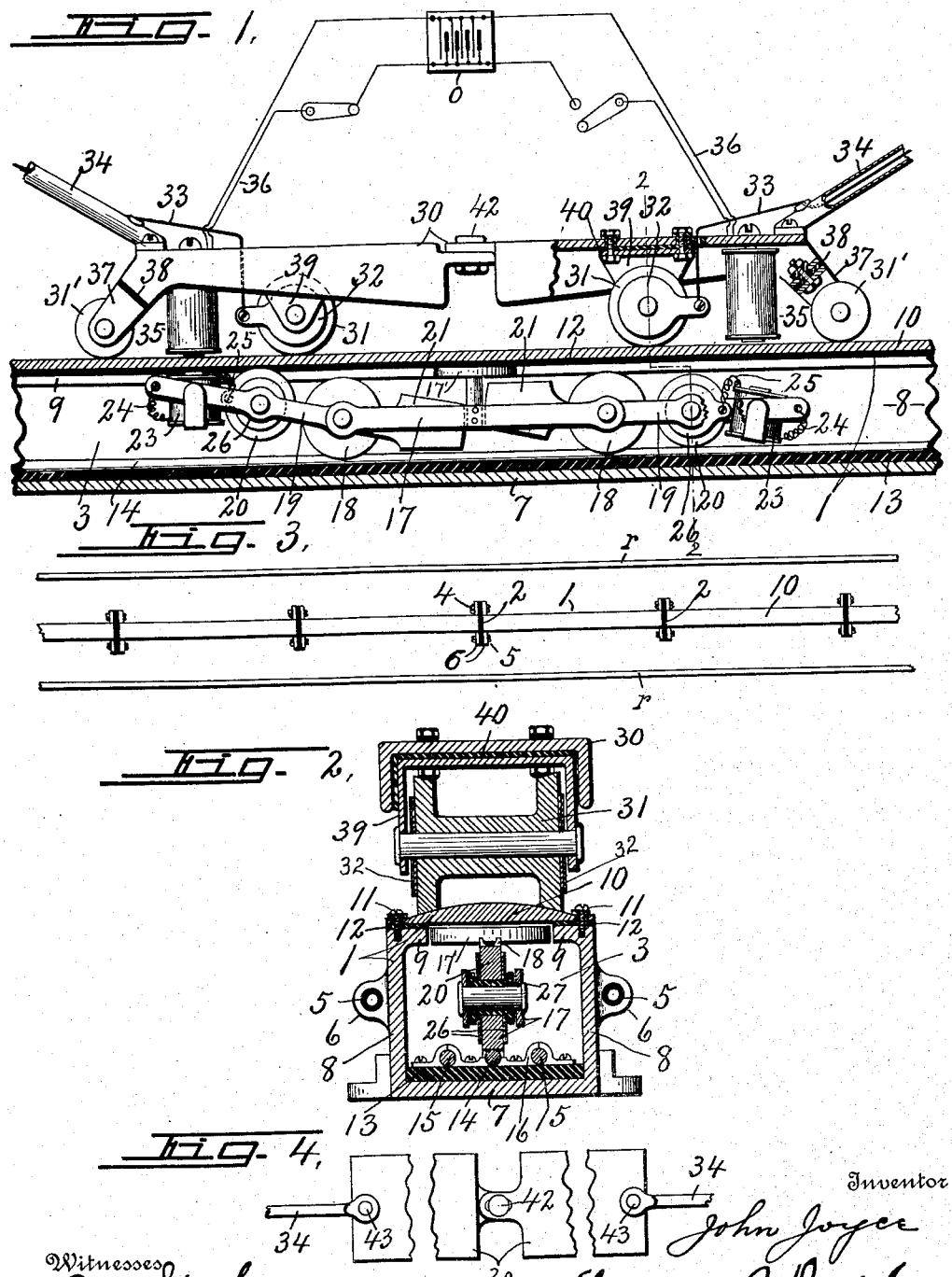
J. JOYCE.
UNDERRUNNING TROLLEY SYSTEM FOR ELECTRIC CARS.
APPLICATION FILED JAN. 25, 1915.
1,175,268. Patented Mar. 14, 1916.

JOHN JOYCE, OF OSWEGO, NEW YORK.

UNDERRUNNING-TROLLEY SYSTEM FOR ELECTRIC CARS.

1,175,268.  Specification of Letters Patent.  Patented Mar. 14, 1916.

Application filed January 25, 1915. Serial No. 4,349.

*To all whom it may concern:*

Be it known that I, JOHN JOYCE, a citizen of the United States, and resident of Oswego, in the county of Oswego, in the State of New York, have invented new and useful Improvements in Underrunning-Trolley Systems for Electric Cars, of which the following, taken in connection with the accompanying drawings, is a full, clear, and exact description.

This invention relates to certain improvements in under-running trolley systems for electric cars and involves the use of a hollow third rail composed of sections arranged end to end along the road-bad and insulated from each other for receiving the trolley wire and feed wires together with a suitable follower which is operated magnetically by suitable mechanism on the car under the control of the operator and is provided with means for transmitting current from the trolley wire to the surface of the rail from which the current is conducted to the motor or motors of the car through the medium of surface contacts carried by the car truck and suitable conductors leading from said contacts to the motor.

The primary object is to provide a simple, practical and efficient under-running trolley system in which only a relatively small portion of the third rail directly under or in the immediate vicinity of a car will be energized at any time, and at the same time to conceal the live trolley and feed wires within a dust and weather proof housing where they are not only protected from the elements and other foreign matter but obviate any liability from accident by contact with the live conductors beyond the limits of the car.

Another important object is to provide magnetic means controlled by the motorman for drawing the under-running follower along with the car so as to be in position at all times to transmit the current from the trolley wire to the surface of the third rail, whence it may be conducted to the motors in the manner previously mentioned.

Other objects and uses relating to specific parts of the apparatus will be brought out in the following description.

In the drawings—Figure 1 is a side elevation, partly in section, of the under-running trolleys and portions of the conductors along which they are adapted to travel. Fig. 2 is a transverse vertical sectional view taken on line 2—2, Fig. 1. Fig. 3 is a top plan of a portion of a railway track showin the sectional conductor or third rail. Fig. 4 is a top plan, partly broken away, of the upper trolley supporting frame shown in Fig. 1, except that the trolley arms are pivoted thereto.

In carrying out the objects stated, a hollow conduit or third rail —1— is suitably installed in the roadbed preferably mid-way between and lengthwise of the rails —r— of the track along and upon which the electric car is adapted to travel, said conduit being insulated from the rails of the track, and is composed of sections preferably of less length than the car, and arranged end to end with interposed insulation —2— between the meeting ends so as to insulate the sections one from the other, and at the same time forming a continuous opening or passage —3— therethrough for portions of the under-running follower hereinafter described.

The meeting ends of the conduit sections are clamped together by suitable bolts —4— which are passed through insulated bushings —5— in laterally projecting lugs —6— on the sides of the sections to hold them in perfect alinement, the bushings —5— serving to additionally insulate the sections one from the other.

Each conduit section preferably consists of an elongated box-like structure of cast iron or other suitable material composed of a bottom member —7—, side members —8— integral therewith and an exposed top plate —10— of copper or equivalent material of high electric conductivity secured by bolts —11— to the upper edges of the side members —8— but insulated therefrom by strips —12— of fiber or other insulating material.

The upper edges of the sides —8— are spaced some distance apart and provided with inturned flanges —9—, forming guides for guiding the under-running trolley hereinafter described in an upright position when at rest.

Secured to the upper surface of the bottom —7— is a bed-piece —13— of fiber or equivalent insulating material and upon this bed-piece is mounted a bare trolley wire —14— and one or more feed wires —15— by which current may be supplied from the source of electric energy to the trolley wire —14—, said wires being held in fixed relation to each other and to the fiber plate —13— by suitable clamps —16— as shown more clearly in Fig. —3—, the trolley wire —14— running longitudinally through the entire series of sections along the track and is preferably disposed centrally in the bottom of the hollow conduit between the feed wires —15— to which it is electrically connected at intervals by the clamps —16—.

A carriage or follower —17— is movable lengthwise of and within the conduit —1— and is preferably provided with a pair of trolley contact wheels —18— running along and upon the conductor —14—, said carriage being provided at its opposite ends with separate rock arms —19— which are journaled upon the main supporting frame —17— co-axial with the trolley wheels —18— and are adapted to support additional trolley wheels or contacts —20—. The carriage —17— is also provided with a guide member —17'— riding between the flanges —9— as shown more clearly in Fig. 2 to hold the carriage in an upright position against undue lateral movement or displacement from the conductor —14—. The member —17'— is suitably insulated in any well-known manner from the carriage —17— to prevent short circuit in case of contact with the flanges —9—.

The contact wheels —20— are located at the front sides of the adjacent wheels —18— and are partially counter-balanced by weights —21— on the rock arms —19— at the opposite side of the wheels —18—, thereby permitting the contact wheels —20— to be rocked into and out of contact with the underside of the contact plate —10—. Mounted upon the forward ends of the rock arms —19— are separate electro-magnets —23— which are electrically connected by wires —24— to the corresponding ends of the rock arms —19—, said electro-magnets being also connected by wires —25— in series with corresponding contact disks —26— which are in electrical contact with the adjacent contact wheels —20—. These contact wheels —20— are insulated from the rock arms —19— by bushings —27— of fiber or equivalent insulating material.

A trolley supporting frame —30— is mounted in any suitable manner upon the truck of the car and upon this frame is journaled suitable trolley wheels or contacts —31— adapted to ride along and upon the upper surface of the contact plates —10— and are, therefore, in electrical connection with the trolley wire —14— when the adjacent trolley wheel —20— is in contact with said plate.

Associated with the trolley wheels —31— are contact disks —32— which are electrically connected by wires —33— to the motor or motors not shown of the car, said wires being extended through hollow trolley arms —34— on the opposite ends of the frame —30—. A pair of electro-magnets —35— are also mounted upon the opposite ends of the frame —30— just in front of their respective trolley wheels —31— and are electrically connected by wires —36— to a suitable source of electric energy, as a storage battery —o— on the car, for energizing said magnets.

The magnets —35— are alined vertically with the electro-magnets —23— on the follower, but their adjacent poles are of opposite polarity so that when the co-acting magnets are energized, the magnetic attraction between the poles of each magnet will be sufficient to draw the carriage —17— along with the moving car, and at the same time rocking the corresponding arm —19— upwardly to contact its wheel —20— with the underside of the conductor —10—.

The lower poles of the electro-magnets —35— travel in close proximity to the upper surface of the contact plates —10— with just sufficient clearance to prevent contact therewith and are held in this relation by the contact wheels —31— and additional pilot wheels —31'— which are mounted upon brackets —37— in front of the adjacent electro-magnets —35—, said brackets being insulated from the main frame —30— by suitable insulation —38— as best seen in Fig. 1. The trolley contacts —31— are also mounted upon brackets —39— which are secured to the underside of the frame —30— and are insulated therefrom by suitable insulation —40— of fiber or other equivalent material. It is now clear that the trolley contacts —31— and pilot wheels —31'— while traveling in contact with the conductor —10— are insulated from the main supporting frame —30— and therefore from the car to prevent any possibility of short circuits in conducting the current from the trolley wheels —31— to the motors when one or the other of the trolley contacts —20— is brought into contact with the underside of the conductor —10— by energizing the corresponding electro-magnet —35—. The upper surface of the conductor —10— is preferably convex in cross section, while the peripheries of the trolley wheels —31— and pilot wheels —31'— are concaved in cross section or grooved to conform to the convex contour of the conductor so as to guide the trolley frame along said conductor. This trolley supporting frame —30— may be suspended from the underside of the center of the car or trucks in any suitable manner capable of propelling the frame along with the car and preferably by attaching the trolley arms —34— directly to the truck or trucks at points in proximity to the points of connection of the wires —33— with the car propelling motors not shown.

The length of the trolley supporting frame —30— is relatively short as compared with the length of the truck or body of the car but in some instances it may be necessary to provide for lateral flexing action of the central portion of the frame as in passing around short curves and for this purpose I have shown the frame —30— as composed of sections connected together at the center by a vertical pivotal bolt —42— passing through slightly elongated bolt openings sufficient to permit the central portion of the frame to be deflected toward the outer side of the curve, while the trolley wheels —31— and pilot wheels —31'— follow closely upon the convex surface of the conductor —10— and in some instances I may pivot the trolley arms —31— at —43— to the ends of the frame —30— as shown in Fig. 4 to further facilitate the maintenance of the trolley wheels —31— and pilot wheels —31'— in direct contact with the conductor —10—.

In operating a car, the electric circuit from the battery —o— may be closed by one or the other of the switches shown diagrammatically in Fig. 1, preferably that nearest the front end of the car, the other one being open, the closed circuit serving to energize the electro-magnet —35— at the corresponding end of the trolley frame to attract the adjacent magnet —23— on the underlying follower or carriage —17,— thereby magnetically drawing the adjacent contact wheel —20— into contact with the underside of the top conductor —10— of the third rail, the carriage wheels —18— of the follower being in electrical contact with the feed conductor or trolley wire —14,— for establishing electrical connection between the main conductor —14— and third rail conductor —10— through the medium of the arm —19— carrying the active contact wheel —20—. This operation places the adjacent electro-magnet —23— in the motor circuit of the car through the medium of the contact disk —26— and electrical connection of the magnet —23— with the arm —19— of the follower. Current is now supplied from the main feed wire —14— to the motor of the car through the medium of the forward trolley wheel —31— and its contact disk —32— and wire —33—, thereby impelling the car along the track and magnetically drawing the follower with it, it being understood that as soon as the contact wheel —20— of the follower is brought into contact with the top conductor of the third rail to energize the magnet —23,— the storage battery may be cut out, relying upon the electro-magnetic co-action between the active electro-magnets —23— and —35— to impel the follower along with the car, thereby conserving the energy of the storage battery.

What I claim is:

1. In an under-running trolley system for electric railways, the combination of an exposed sectional conductor and an underlying continuous main conductor, both insulated from each other and from the car-rails, a frame on the car having a trolley in traveling contact with the upper face of the sectional conductor, a follower having a trolley in traveling contact with the continuous conductor, a contact member electrically connected to the last-named trolley and movable into and out of contact with the under side of the sectional conductor, and coöperative electro-magnetic devices on the car and follower, respectively, for holding the contact member in contact with the sectional conductor and causing the follower to move with the car.

2. In an under-running trolley system for electric railways, the combination of a hollow conduit between the car-rails and having an exposed sectional conductor forming the top thereof, a continuous main conductor within the conduit, said conductors being insulated from each other and from the car-rails, a trolley on the car in traveling contact with the upper face of the sectional conductor, a follower in the conduit having electrically connected members, one of which is in traveling contact with the continuous conductor and the other movable into and out of traveling contact with the under side of and self-retracting from the sectional conductor, and electro-magnetic means for establishing the last-named contact.

3. In an under-running trolley system for electric railways, the combination of an exposed sectional conductor and an underlying continuous main conductor, both insulated from each other and from the car-rails, a trolley carried by the car in traveling contact with the upper face of the sectional conductor, electrically connected trolleys, one of which is in traveling contact with the continuous conductor and the other movable into and out of contact with the under side of the sectional conductor and self retractive therefrom, an electro-magnet in circuit with the retractive trolley, an electro-magnet in a separate circuit on the car and coöperating with the first-named magnet to attract the retractive trolley to the sectional rail, and means for opening and closing the separate circuit.

4. In an under-running trolley system, for electric railways, the combination of an exposed sectional conductor and an underlying continuous main conductor, both insulated from each other and from the car-rails, a frame on the car having end pilot wheels and intervening trolley wheels, all arranged in tandem and in traveling contact with the upper face of the sectional conductor, said trolley wheels being insulated from the frame and from the pilot wheels, a follower in traveling contact with the continuous conductor and provided with independently movable rock arms and trolleys for contact with the under side of the sectional conductor, and separate electro-magnetic devices for attracting the rock-arms toward the sectional conductor to cause their trolleys to contact therewith.

In witness whereof I have hereunto set my hand this 14th day of January, 1915.

JOHN JOYCE.

Witnesses:
Ed. Plank,
Jos. T. McCaffrey.

Copies of this patent may be obtained for five cents each, by addressing the "Commissioner of Patents, Washington, D. C."